United States Patent [19]

Ikegami et al.

[11] Patent Number: 5,053,657
[45] Date of Patent: Oct. 1, 1991

[54] MINIATURE MOTOR

[75] Inventors: Masakazu Ikegami; Ryouichi Someya, both of Matsudo, Japan

[73] Assignee: Mabuchi Motor Co., Ltd., Chiba, Japan

[21] Appl. No.: 515,162

[22] Filed: Apr. 26, 1990

[30] Foreign Application Priority Data

May 2, 1989 [JP] Japan ................ 1-52221[U]

[51] Int. Cl.⁵ ............................................ H02K 9/06
[52] U.S. Cl. ................................ 310/63; 310/62
[58] Field of Search .......... 310/40 MM, 52, 58, 60 R, 310/62, 63

[56] References Cited

U.S. PATENT DOCUMENTS 4,092,556  5/1978  Mabuchi ........................ 310/63
4,588,911  5/1986  Gold .............................. 310/62
4,896,065  1/1990  Tsuyama ................. 310/40 MM

FOREIGN PATENT DOCUMENTS 0147944 11/1980 Japan.

Primary Examiner—Steven L. Stephan
Assistant Examiner—Thomas M. Dougherty
Attorney, Agent, or Firm—McGlew & Tuttle

[57] ABSTRACT

A miniature motor comprising a stator having a permanent magnet field fitted to the inside of a motor case, a rotor having a rotor winding and rotatably supported in such a manner as to face the stator, a commutator provided at an end of the rotor, and a cooling fan, in which a plurality of lugs are provided in a projected state on an end face of a core constituting a rotor end portion, a plurality of holes corresponding to the lugs are provided on the cooling fan having a plurality of vanes, and the cooling fan is fixedly fitted to the core and then secured in place by plastic deforming of the lugs.

2 Claims, 3 Drawing Sheets

MINIATURE MOTOR

BACKGROUND OF THE INVENTION

This invention relates generally to a miniature motor incorporating a cooling fan, and more particularly to a miniature motor to which a cooling fan can be easily fitted.

DESCRIPTION OF THE PRIOR ART

High-output miniature motors of a type incorporating a fan for self cooling have heretofore been commonly used. FIG. 1 is a longitudinal section of the essential part of a miniature motor of a conventional type. In FIG. 1, reference numeral 1 refers to a stator. A field 3 consisting of a permanent magnet is fixedly fitted to the inside of a hollow cylindrical motor case 2, and a disc-shaped cover 4 is fitted to an open end of the motor case 2. Reference numerals 5, 6 and 7 are vent holes provided on appropriate positions of the motor case 2 and the cover 4. Numeral 8 refers to a rotor having a rotor winding 10 wound of a core 9, and rotatably supported in such a manner as to face the stator 1. Numeral 11 refers to bearings provided on the motor case 2 and the cover 4 in such a manner as to support both ends of the rotor 8. Numerals 12 and 13 refer to a commutator and a cooling fan, respectively, which are provided at the left end, for example, of the rotor 8. Numeral 14 is a current feeding brush provided in such a manner as to make sliding contact with the commutator 12.

With the above construction, as the rotor 8 rotates, the cooling fan 13 is also caused to rotate, sucking air from the vent holes 5 and 7 and discharging it through the vent hole 6, thereby allowing the rotor winding 10 and other components to cool.

The conventional miniature motor described above, in which the cooling fan 13 is fixedly fitted to the rotor 8 by means of an adhesive, has the following problems:

FIGS. 2 and 3 are an end view and a side elevation of the essential part of the rotor 8 in FIG. 1. Like numerals indicate like parts shown in FIG. 1. In both figures, numeral 15 refers to an adhesive used to fixedly fit the cooling fan 13 to the rotor 8. That is, the rotor winding 10 is wound on the core 9 and the commutator 12 is placed in position, and then both the rotor winding 10 and the commutator 12 are electrically connected to each other. Then, the end faces of the cooling fan 13 and the core 9 and the outer circumference of the commutator 12 are fixedly fitted by means of the adhesive 15.

With the above arrangement, where the cooling fan 13 is in contact with, or close to part of the commutator 12, the cooling fan 13 has to be made of a material having good heat resistance and insulating properties. This could lead to increased manufacturing cost. Furthermore, the abovementioned arrangement, in which the cooling fan 13 is fixedly fitted to the rotor 8 by means of the adhesive 15, involves troublesome operations, such as the coating, drying, and hardening of the adhesive 15. This requires time and labor, resulting in deteriorated working efficiency and productivity.

SUMMARY OF THE INVENTION

It is an object of this invention to facilitate the fixing of the cooling fan to improve working efficiency and productivity.

It is another object of this invention to expand the scope for choice of materials for the cooling fan to reduce material cost.

It is a further object of this invention to eliminate the falling-off of the cooling fan to improve the reliability of miniature motors.

DETAILED DESCRIPTION OF THE EMBODIMENTS

Figure 1:
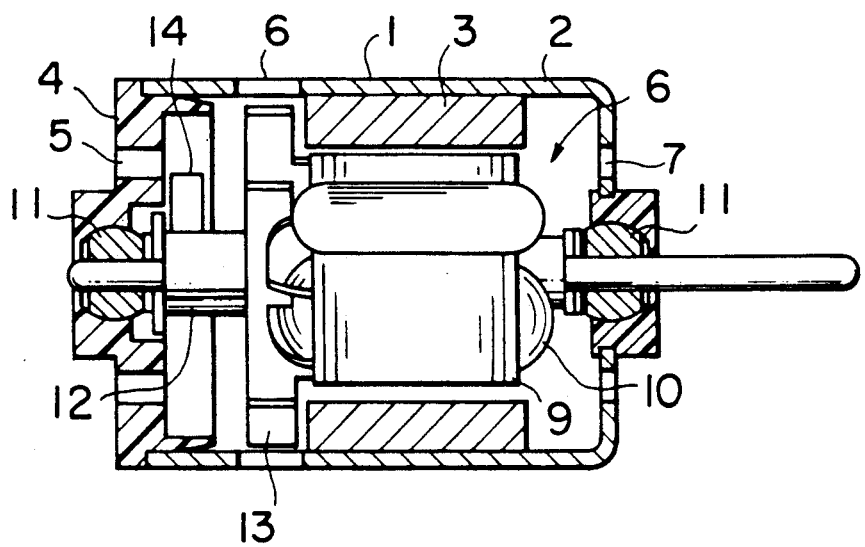
FIG. 1 is a longitudinal section of the essential part of a miniature motor according to the prior art.
Figure 2:
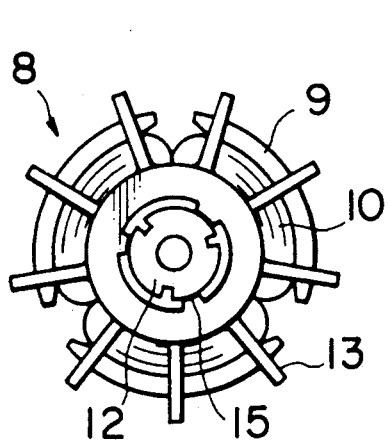
FIG. 2 is an end view illustrating the rotor shown in FIG. 1.
Figure 3:
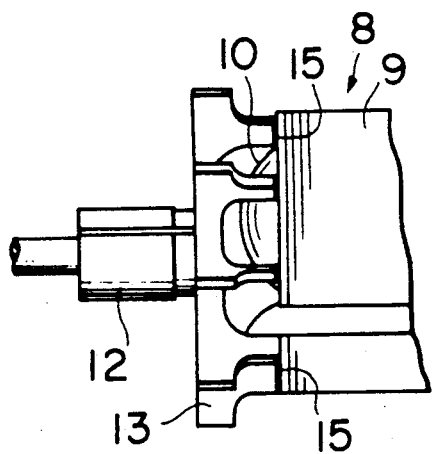
FIG. 3 is a side elevation illustrating the essential part of the rotor shown in FIG. 1.
Figure 4:
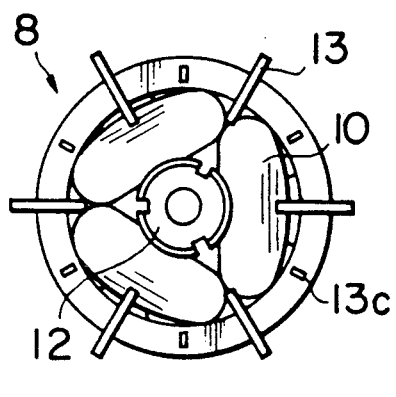
FIGS. 4 and 5 are an end view and a side elevation of the essential part of an embodiment of this invention.
Figure 5:
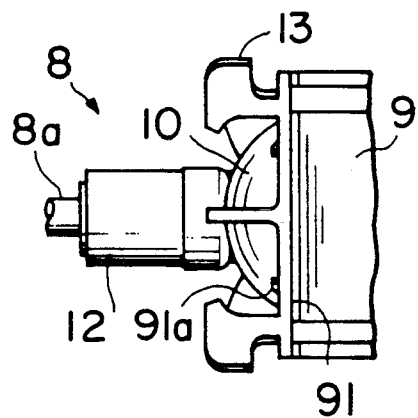
Figure 6:
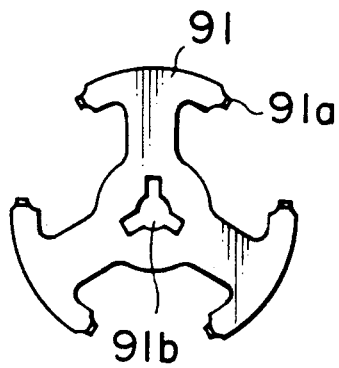
FIG. 6 is an end view of the end portion of the core shown in FIG. 5.
Figure 7:
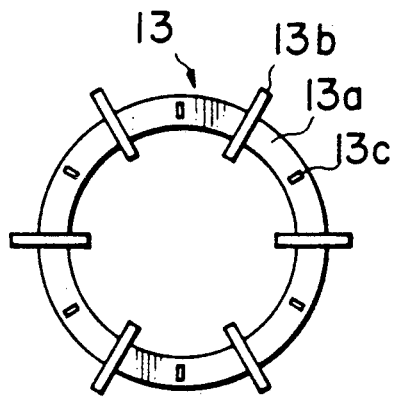
FIGS. 7 and 8 are an end view and a side elevation of the cooling fan shown in FIGS. 4 and 5.
Figure 8:
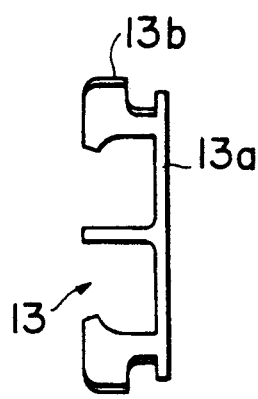

FIGS. 4 and 5 are an end view and a side elevation of the essential part of an embodiment of this invention. FIG. 6 is an end view of the end portion of the core shown in FIG. 5. FIGS. 7 and 8 are an end view and a side elevation of the cooling fan shown in FIGS. 4 and 5. Like parts are indicated by like numerals shown in FIGS. 1 through 3. Referring to FIGS. 4 through 8 in particular, the arrangement according to the invention includes a plurality of lugs 91a (see FIGS. 5 and 6) provided in a protruded state on an end face of a core end portion 91 forming the end portion of the core 9. The lugs 91a should preferably be formed by pressing operation at the time of formation of the core end portion 91. Next, a cooling fan 13 consists of a ring-shaped mounting portion 13a, and a plurality of vanes 13b provided in a protruded state formed integrally with the mounting portion 13a, on which a plurality of holes 13c are provided. In this case, the positions of the holes 13c are adapted to correspond with the lugs 91a of the core end portion 91. A cooling fan 13 of this type can be effectively manufactured with the injection molding of plastic materials, for example.

With the above-mentioned arrangement, the rotor 8 is assembled by laminating the core 9, and the press-fitting then core end portion 91 to the shaft 8a at the left end of the core 9, as shown in FIG. 5. At this time, electrical insulation should preferably be provided by applying an insulating material to the core end portion. In press-fitting the core end portion 91 to the shaft 8a, a hole 91b shown in FIG. 6 is used a guide. Next, a rotor winding 10 is wound on the core 9 and the core end portion 91, and then electrically connected to a commutator which has been provided in advance, as shown in FIGS. 4 and 5. The cooling fan 13 is fixedly fitted to the core end portion 91 by engaging the lugs 91a on the core end portion 91 shown in FIG. 6 to the holes 13c shown in FIG. 7, and by plasticly deforming the lugs 91a.

Figure 9:
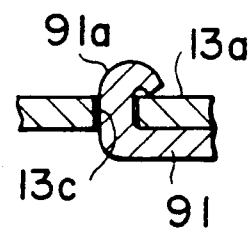
FIGS. 9 and 10 are enlarged cross-sections of the essential part of the means for plastic deforming the lugs shown in FIG. 6.
Figure 10:
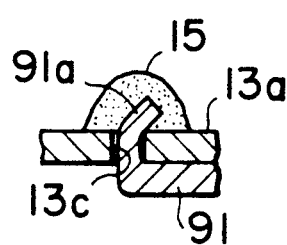
Figure 11:
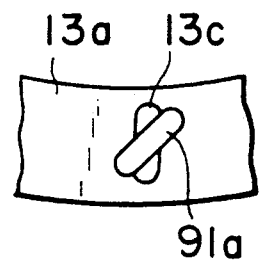
FIG. 11 is an enlarged end view of the essential part of another means for plastic deforming the lugs shown in FIG. 6.

FIGS. 9 through 11 are enlarged cross-sections and enlarged end views illustrating an example of a means for plastic deforming the lugs 91a shown in FIG. 6. Like parts are indicated by like numerals shown in FIGS. 4 and 5. FIG. 9 shows an example where the mounting portion 13a is fixedly fitted to the core end portion 91 by staking the lugs 91a to make the size of the tip thereof larger than the size of the holes 13c. FIG. 10 shows an example where the lugs 91a are bent or folded flat to the side of the mounting portion 13a, and then the adhesive 15 is applied to the bent or folded portion. In this case, since the adhesive 15 is used as an auxiliary means for fixedly fitting the lugs 91a, only a small amount of adhesive is needed. Furthermore, FIG. 11 shows an example where the mounting portion 13a is fixedly fitted to the core end portion by twisting the lugs 91a on a plane parallel to the end face of the mounting portion 13a.

In the aforementioned embodiment, description has been made on an example where the cooling fan is made of a plastic material, this invention is not limited to this arrangement, but other metallic or non-metallic materials may be used. As a means for plastic deforming the lugs to fixedly fit the cooling fan, any publicly known plastic-deforming means other than that shown in the aforementioned embodiment may be used to achieve the same effect. And, needless to say, such plastic-deforming means may be used in conjunction with an adhesive.

This invention having the aforementioned construction and operation can accomplish the following effects.

(1) Since the cooling fan can be fixedly fitted to the rotor by plastic deforming the lugs, the cooling fan fixing operation can be made quite easily, and working efficiency and productivity can be improved.

(2) Since the colling fan does not come in direct contact with the commutator, rotor winding and other components that produce heat, the scope for selection of materials can be expanded, and thus material cost can be reduced.

(3) Since the cooling fan is fixedly fitted to the rotor by engaging the lugs of the core end portion to the holes provided on the cooling fan, there is no fear of falling off the cooling fan. This leads to improved reliability.

What is claimed is:

1. A miniature motor, comprising: a stator having a permanent magnet field fixedly fitted to the inside of a motor case;
   a rotor having laminated rotor core, said core having rotor core support elements extending radially outwardly, windings wound on said laminated rotor core and rotatably supported such that said windings face said stator, said rotor core support elements having end faces with lugs protruding in an axial direction of said rotor;
   a cooling fan element including a plurality of holes corresponding to said protruding lugs, said cooling fan having a plurality of veins, each lug of said protruding lugs extending through a corresponding one of said plurality of holes and being deformed to retain said cooling fan adjacent the end face of the core.

2. A miniature motor, comprising: a stator having a permanent magnet field fixedly fitted to the inside of a motor case, a rotor having a rotor winding and rotatably supported in such manner as to face said stator;
   a commutator provided at an end of said rotor;
   a cooling fan;
   a plurality of lugs provided in a protruded state on an end face of a core constituting an end portion of said rotor, a plurality of holes corresponding to said lugs provided on said cooling fan, said lugs having tips which are bent or folded flat to the side of a cooling fan mounting portion and an adhesive applied to said bent or folded portions to fixedly fit said cooling fan to said core.

* * * * *